Nov. 10, 1959   D. E. SINGELMANN ET AL   2,912,188
JET PROPELLED AIRCRAFT WITH TILTABLE COMBUSTION CHAMBERS
Filed Sept. 15, 1955   4 Sheets-Sheet 1

INVENTORS:
DIETRICH E. SINGELMANN
and JAMES R. HALL
BY
Beau, Brooks, Buckley & Beau,
ATTORNEYS.

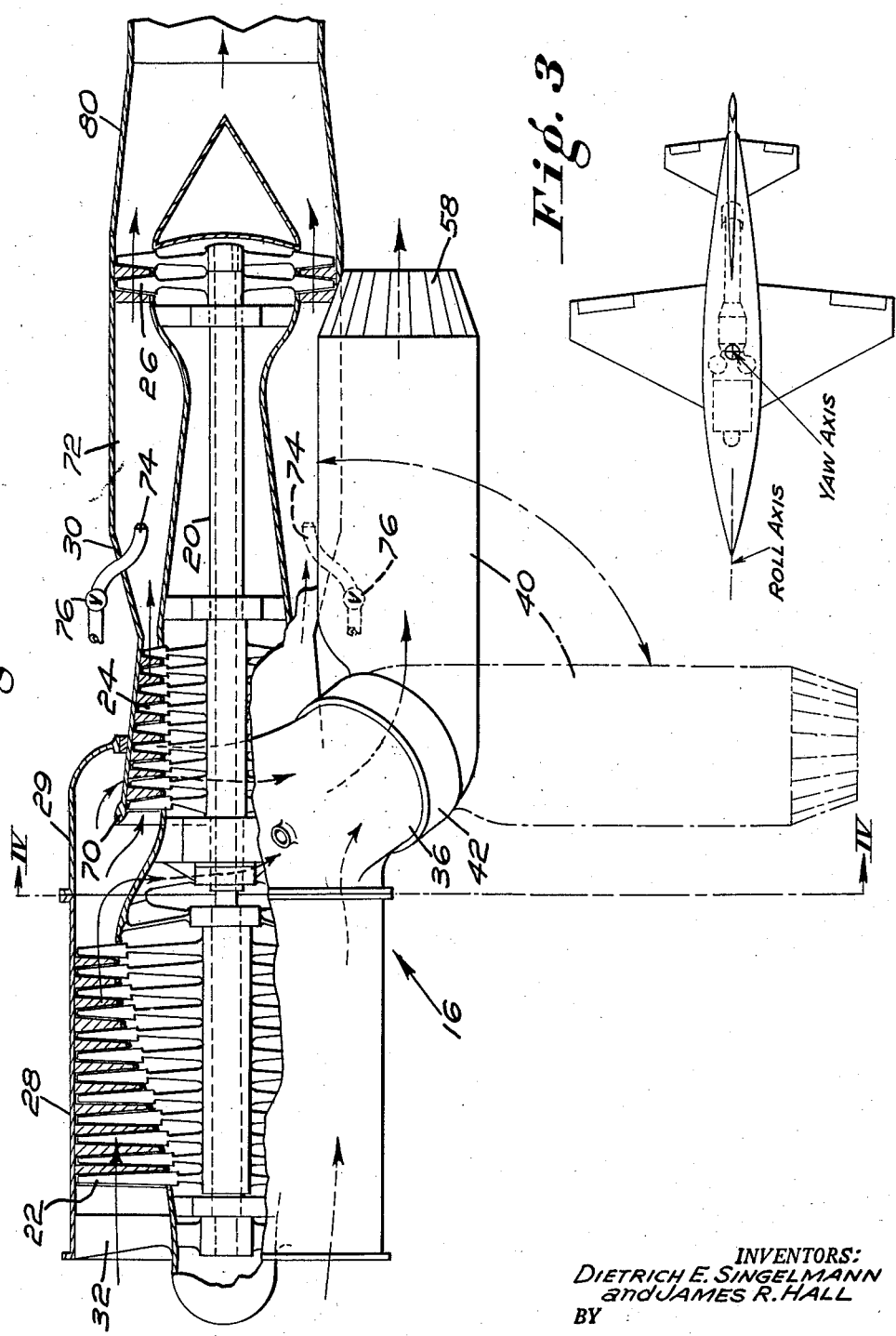

Nov. 10, 1959     D. E. SINGELMANN ET AL     2,912,188
JET PROPELLED AIRCRAFT WITH TILTABLE COMBUSTION CHAMBERS
Filed Sept. 15, 1955     4 Sheets-Sheet 3
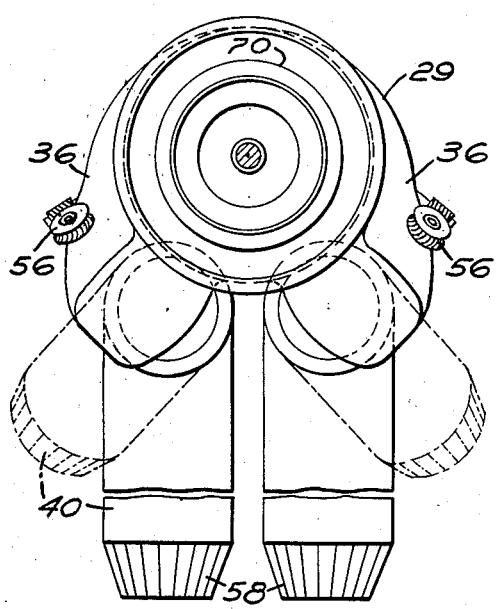
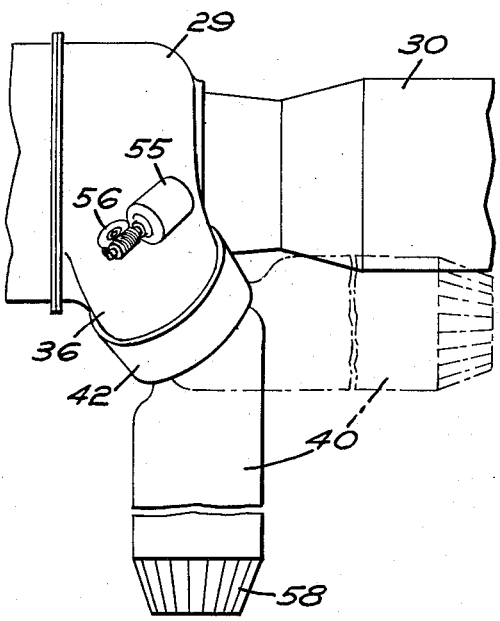
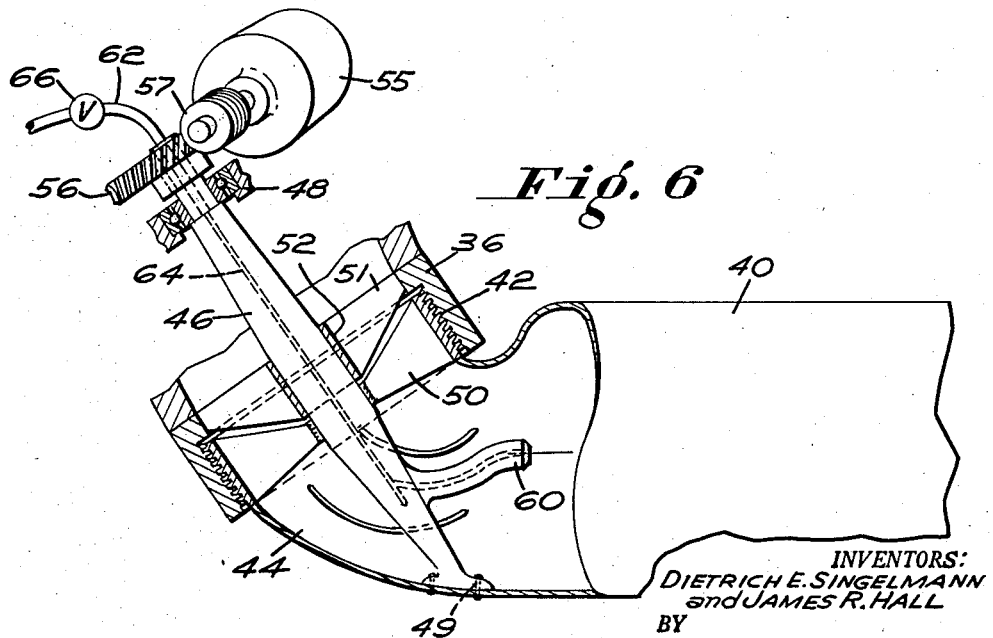
INVENTORS:
DIETRICH E. SINGELMANN
and JAMES R. HALL
BY
Beau, Brooks, Buckley & Beau,
ATTORNEYS.

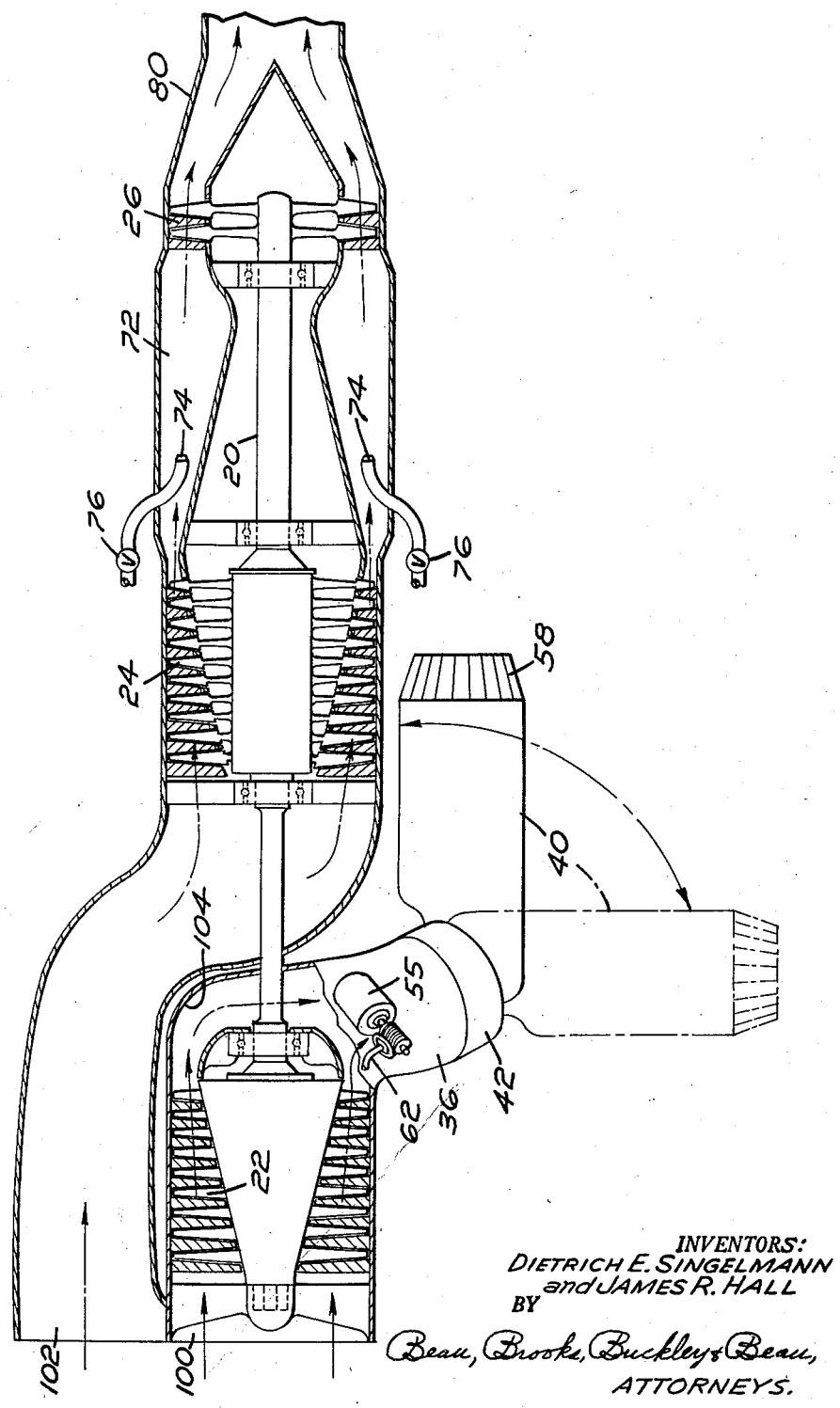

United States Patent Office 2,912,188
Patented Nov. 10, 1959

2,912,188

JET PROPELLED AIRCRAFT WITH TILTABLE COMBUSTION CHAMBERS

Dietrich E. Singelmann, Snyder, and James R. Hall, Kenmore, N.Y., assignors to Bell Aircraft Corporation, Wheatfield, N.Y.

Application September 15, 1955, Serial No. 534,532

3 Claims. (Cl. 244—12)

This invention relates to improvements in aircraft of the type designed to take off and land vertically while remaining in horizontal attitude; the invention being particularly directed to improvements in gas turbine propulsion engines for such aircraft and improved means therein for selective direction of the engine thrust output between horizontal and vertical directions.

It is a primary object of the present invention to provide a gas turbine type aircraft engine with means for adjusting in novel manner the direction of thrust output from the engine jet nozzles.

Another object is to provide an improved multi-nozzle aircraft jet engine which is adapted to selective operation either as a directionally stabilized horizontal thrust engine or as a directionally stabilized vertical thrust engine.

Another object is to provide an engine as aforesaid whereby the thrust output nozzles thereof are in positionally spaced apart relation, and the engine control system permits coordination of the nozzle outputs under all operative conditions, so as to obtain directional stabilization of the aircraft when moving in either horizontal or vertical directions.

Other objects and advantages of the invention will appear from the specification hereinafter.

Fig. 1 is a side elevational view of an aircraft embodying an engine arrangement of the present invention;

Fig. 2 is a fragmentary longitudinal sectional view through an engine of the invention such as is suitable for installation in the aircraft as shown in Fig. 1; the engine arrangement of Fig. 2 being basically of the ducted fan or turbo-fan type, modified in accordance with the present invention to provide for diversion of by-pass air flow from the fan into auxiliary thrust chambers which are swingable between vertical and horizontal thrust attitudes;

Fig. 3 is a plan view of the aircraft of Fig. 1;

Fig. 4 is a section taken along line IV—IV of Fig. 2;

Fig. 5 is a fragmentary side elevational external view of the air diversion portion of the engine structure;

Fig. 6 is a fragmentary elevational-sectional view, on enlarged scale, through one of the auxiliary thrust chamber devices and its swing control mechanism;

Figure 1:
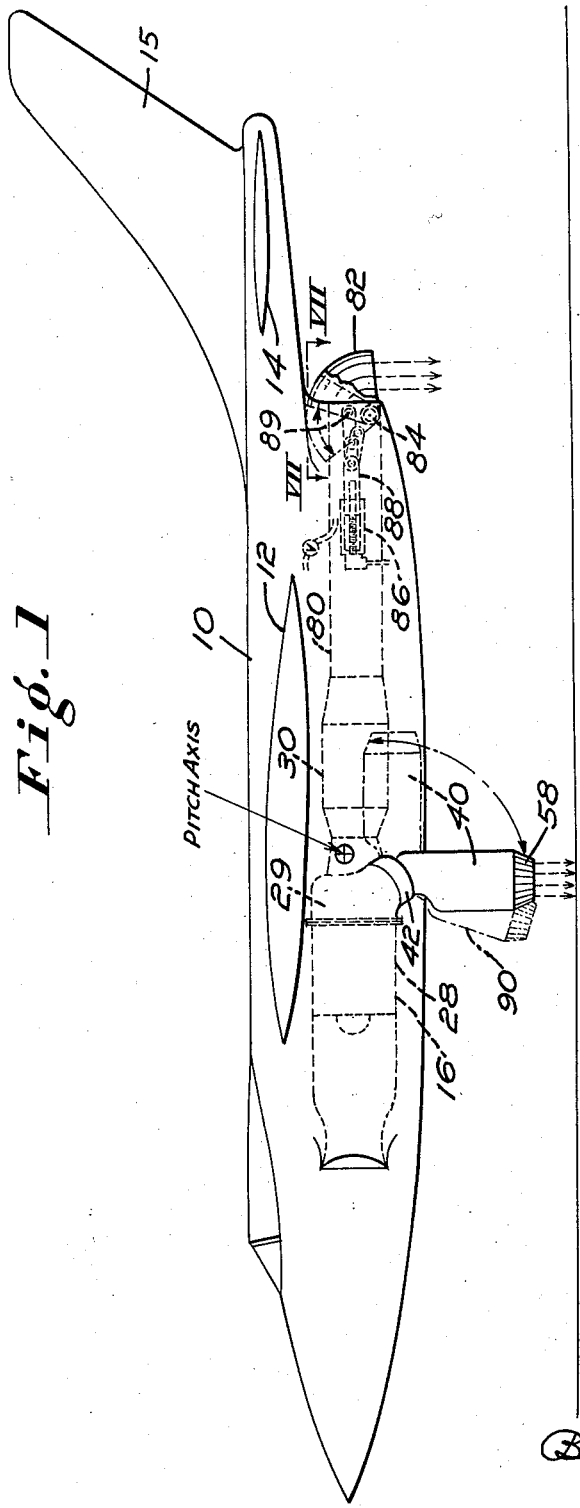
Figure 7:
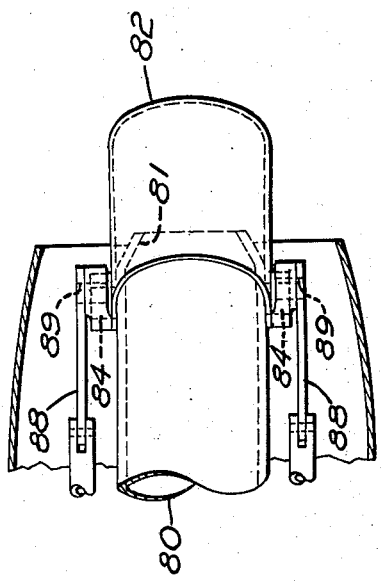

Fig. 7 is a fragmentary top plan view of a portion of the jet thrust directing mechanism of the engine, as indicated at VII—VII of Fig. 1; and Fig. 8 is a fragmentary longitudinal sectional view through a gas turbine propeller type engine modified in accord with the present invention to include an auxiliary compressor which in turn supplies air to an auxiliary jet nozzle system which is adjustable to variously direct the thrust outputs thereof between vertical and horizontal directions.

The invention contemplates provision in an airplane of a turbine-jet type engine having at least three jet discharge nozzles relatively spaced in the airplane plan view so as to straddle the airplane pitch, roll, and yaw axes, and directionally variable between horizontal and vertical attitudes for propelling the airplane either vertically (while the airframe remains in horizontal attitude) or horizontally as in normal flight. Furthermore, it is contemplated to make provision for independent variable controls of the jet nozzle thrust outputs, such as by adjustments of fuel throttles and exhaust nozzle areas. Said controls may be connected into and actuated by adjustments of the conventional manual or auto-pilot operated pitch-roll-yaw control mechanisms of the airplane. Hence, when operating either in vertical or horizontal flight maneuvers, through customary manipulations of the conventional flight control column, and the rudder pedals, the pilot obtains stability control as well as directional control without necessity for provision of extraneous attitude control devices such as auxiliary jets at the wing tips and tail, or the like.

As illustrated in Figs. 1–7 inclusive, an airplane of the present invention may comprise any suitable shaped fuselage designated 10 having wing panels 12—12 at opposite sides thereof and a horizontal tail surface 14 and a vertical fin and rudder as indicated at 15, as is well known in the airplane art. An engine arrangement of the present invention is indicated generally at 16 and is illustrated in Fig. 1 as being mounted to lie horizontally along the plane of symmetry of the airplane (Fig. 3).

As shown in greater detail in Figs. 2, 4, 5, 6, 7, the particular form of engine illustrated therein is basically of the ducted fan or turbo-fan type, and comprises generally a rotating shaft 20 carrying at its forward end a multi-stage compressor or fan indicated at 22; an intermediately disposed high pressure compressor 24; and at its rear end a turbine designated 26. The fan 22 is enclosed within a forward casing 28 which connects to the by-pass casing 29, and the compressor 24, and the turbine 26 are enclosed within an aft casing portion 30. In the case of the present invention the by-pass casing 29 is modified to cause the by-pass portion of the fan output air from the compressor 24 to flow into a pair of ducts 36—36 (Figs. 2, 4, 5) which deliver the by-passed air into a pair of auxiliary thrust chambers designated 40—40. It will be noted that the auxiliary thrust chambers 40—40 are pivotally connected to the corresponding ducts 36—36 by means of sleeve couplings having labyrinth seals, as indicated at 42—42. The auxiliary chambers 40 are formed with curved neck portions as indicated at 44 (Fig. 6) and are mounted by means of shafts 46 which are journaled in the fixed engine frame as indicated at 48. The chambers 40—40 are attached to the shafts 46 as indicated at 49, and by means of spokes 50 which extend from the end portion of the chamber. The ducts 36 are provided with spokes 51 interiorly thereof which carry hubs 52 engaging the shafts 46. The shafts 46 are positioned upon the engine frame so as to be canted or skewed at substantial angles in two directions in relation to the longitudinal axis of the engine; and thus it will be understood that upon rotation of the shafts 46—46 the combustion chambers 40—40 will be thereby swung through arcuate paths alternatively between horizontally and rearwardly pointed directions, and vertically and downwardly pointed directions, as is illustrated for example by the broken and solid line showings thereof in Figs. 1, 4 and 5. This method for mounting the auxiliary combustion chambers provides for the thrust direction variations referred to by simple rotations of the chambers upon the shafts 46. However, it is contemplated that any other suitable means may be employed to variably direct the thrust forces generated by the auxiliary combustion chambers. To provide for such rotation of the auxiliary combustion chambers 40, the shafts 46 may of course be driven by any suitable means under control of the aircraft pilot; such as for example by means of an electric motor as indicated at 55 operating through means of a worm gear or the like as indicated at 56—57; the gear 56 being keyed to the shaft 46.

The auxiliary thrust chambers 40 are of course fitted at their discharge ends with an appropriate jet exhaust nozzle, preferably of the variable area type, as indicated at 58. The interior construction of the nozzles 58 is not illustrated herein because it will be understood that they may be of any suitable form and do not, per se, comprise any portion of the present invention. As indicated at 60, a fuel supply nozzle is arranged interiorly of each of the auxiliary combustion chambers 40, for delivering suitable fuel as from a conduit 62 (Fig. 6) connected into an internal bore 64 within the shaft 46; the supply fuel to the nozzle 60 being of course metered, as by means of a valve device or the like as schematically indicated at 66. The valve 66 will of course comprise a portion of the usually integrated control system required for such engines.

The casing enclosing the compressor 24 terminates at its front end in an air flow dividing edge portion 70 (Fig. 2) which serves to split the air discharge from the fan 22 into an inner air stream which enters the compressor 24 and an outer air stream which is delivered by the manifold 29 into the ducts 36—36 and thence into the auxiliary combustion chambers 40—40, as shown in better detail in Fig. 4. The air passing through the compressor 24 and discharged thereby moves into the primary combustion chamber 72 of the engine wherein it is mixed with fuel admitted by nozzles as indicated at 74 (Fig. 2); the flow of fuel through the nozzle 74 being of course metered as by means of any suitable valve device or the like as indicated schematically at 76. The fuel-air mixture in the combustion chamber 72 is of course initially ignited, as by means of any suitable spark plug or any other type igniter as is well known in the art, and the products of combustion then flow through the turbine 26 thereby causing the latter to drive the engine shaft 20 and in turn the fan 22 and the compressor 24. The turbine may be either of the single or the compound type, and if a turbine of the single type is employed, only one engine shaft will of course be keyed thereto, and the fan and the compressor devices 22, 24 will also be keyed to the single shaft and will all turn at the same speed as the turbine. Or, if preferred, a compound type turbine may be employed as illustrated for example in Fig. 2 wherein the high pressure turbine portion will be keyed to an outer shaft which connects to the compressor 24, while the low pressure turbine portion is keyed to an inner shaft rotating within the outer shaft and carrying the fan 22. Thus, the fan 22 and the compressor 24 will be driven to rotate at different speeds.

In either case of course the discharge from the turbine flows through an exhaust duct 80 which extends rearwardly of the engine, and as shown in Figs. 1, 7 the exhaust pipe 80 will be arranged to discharge through a jet nozzle 81 horizontally at the rear end of the airplane in normal horizontal flight of the airplane. however, a thrust-flow deflector of truncated elbow form as indicated at 82 is pivotally mounted as indicated at 84 upon the fixed aircraft structure, whereby upon oscillation of the elbow 82 between retracted and extended positions as illustrated by broken lines and solid lines, respectively in Fig. 1, the exhaust jet from the main combustion chamber of the engine will be variously vectored between horizontal and vertically downward directions. It will of course be appreciated that any suitable form of jet nozzle deflector device may be employed in lieu of the truncated elbow form thereof illustrated in the drawing; and that any suitable mechanism may be employed for adjusting the latter to the desired position to obtain the desired vectoring of the jet nozzle discharge. For example, as illustrated in Figs. 1 and 7, the elbow device 82 may be actuated by means of a screw jack as indicated at 86 which motivates a linkage system as indicated at 88 connecting to the deflector member 82 at positions offset from its center of pivoting, as indicated at 89.

Thus, an airplane of the invention as illustrated in Figs. 1-7 is adapted to take off and land in conventional ground-run manner when the auxiliary combustion chambers 40—40 and the deflector 82 are all adjusted to elevated horizontal jet discharge positions. Also, for normal cruising in horizontal flight the auxiliary chambers 40—40 and the deflector 82 will be similarly maintained in upwardly retracted or horizontal discharge positions. For maximum fuel economy during cruising the fuel valves 66 will be closed whereby only air passes through the chambers 40—40 and the entire fuel consumption takes place in the main chamber 72. However, by virtue of the arrangement of the present invention the airplane as illustrated herein is adapted to take off and land vertically while the air-frame remains in substantially horizontal attitude. For this purpose the auxiliary combustion chambers 40—40 and the deflector 82 are swung so as to deflect their corresponding jet nozzle discharges in vertically downward directions. Thus, the motivating controls for positional adjustments of the auxiliary chambers 40—40 and deflector 82 will preferably be coordinated and simultaneously operable by manipulation of an appropriate pilot-controlled device, whereby the motors 55—55 and the control jack 86 will operate simultaneously to convert the airplane to either a vertically moving or horizontally moving aircraft.

Also, it will be appreciated that in the case of the present invention the aircraft as illustrated and described hereinabove may be operated so as to take off vertically to the desired height, and then to convert into a horizontally flying aircraft, by pilot manipulation of the device controlling the motors 55, 86 so as to swing the combustion chambers 40 and the deflector 82 upwardly into horizontal jet thrusting positions. It will of course be appreciated that the motor devices for so adjusting the jet thrust nozzles will be arranged to move at appropriate rates so that the transition between vertically hovering and horizontal forward flight may be accompanied by no undesirable loss of altitude. As the forward thrust components of the jet nozzle discharges increase, due to progressive swinging of the combustion chambers and deflector between vertically downward and horizontal positions, the forward speed of the aircraft will increase thereby resulting in appropriate transfer of lift from the jet discharges to the airplane wing panels 12—12.

The rate of adjustment of the control devices referred to hereinabove therefore will be arranged to take into consideration the fact that the jet nozzle discharges must continue to provide lift components until such time as the aircraft has attained or exceeded wing stalling speed. For normal horizontal flight, it will of course be preferred that the auxiliary combustion chambers 40—40 will be completely retracted upwardly into horizontally thrusting positions, and that the deflector 82 will be completely retracted so as to permit the nozzle thrust from the main combustion chamber of the engine to be directed horizontally rearwardly from the aircraft.

Reversely, the airplane of the invention may be controlled so as to land vertically (while in horizontal attitude) at the terminal of a horizontal flight maneuver. For this purpose, as the plane approaches the desired landing spot the pilot causes the auxiliary combustion chambers and the main jet nozzle deflector to be projected downwardly, thereby terminating the forward thrust power application. At the same time the thrusts from the engine nozzles are now directed vertically downwardly so as to provide sufficient lift to control the aircraft in either hovering or a slowly descending maneuver while remaining in a horizontal attitude. Obviously, pilot control of the fuel feeds to the combustion chambers and of the variable areas of the jet nozzles will enable him to regulate the rate of descent to the selected landing spot.

In order to effect a precise landing upon a relatively small preselected landing spot, the pilot may readily control the directions of the thrusts of the nozzles of the engine so as to obtain slight horizontal thrust components in addition to the primary vertical thrust components, thereby "warping" the airplane to the preselected landing spot. For this purpose, the auxiliary combustion chambers 40—40 are preferably provided so that they may also be tilted slightly forwardly and beyond the precisely vertically downward position thereof shown in Fig. 1; as illustrated for example by the broken lines designated 90, in Fig. 1.

The airplane of the present invention is also adapted to operate in accord with a modified ground-run take off technique; for example, in event the engine thrust is less than sufficient to effect a vertical take off maneuver as explained hereinabove. In this case the airplane starts its take off run with all thrust nozzles directed rearwardly util the craft attains a speed at which the wing lift combined with the available vertical thrust from the engine somewhat exceeds the aircraft gross weight. The thrust nozzles are then swung down to create maximum upward thrust components, thereby "hopping" the aircraft off the ground after a much shorter ground run than usual in a similar airplane with fixed directional thrust. Upon becoming airborne, the thrust nozzles may be redirected rearwardly to provide continued efficient flight. Or, alternatively, prior to take off the thrust nozzles may be set at some attitude intermediately of the horizontal and vertical. The take off then commences with a ground run until the wing lift and the vertical thrust component of the engine output exceeds the aircraft gross weight, whereupon the aircraft climbs. The nozzles are then adjusted according to the desired flight maneuvers.

Fig. 8 of the drawing herewith illustrates application of the invention to another type gas turbine engine, commonly referred to as the turbine-propeller type gas turbine engine. In this case the fan and compressor components are supplied with air through separate ducts; the fan 22 being supplied by an inlet duct 100 while the compressor 24 is supplied by an air inlet duct 102. In this instance however, the entire discharge from the fan 22 is directed by means of a manifold 104 into the paired ducts 36—36 as employed in the example illustrated in Figs. 2, 4, 5, hereinabove. Thus, in the case of the engine of Fig. 8, the ducts 36—36 deliver air into a pair of auxiliary combustion chambers 40—40 as was previously described hereinabove in connection with the engine of Figs. 1–7; and fuel of course is also fed to the combustion chambers 40—40 in the case of the engine of Fig. 8, as in the manner described hereinabove. Also, fuel is delivered to the main combustion chamber 72 of the engine of Fig. 8, as explained in connection with the engine of Figs. 1–7. Also, it will be understood that any suitable means for swinging the combustion chambers 40—40 between vertical and horizontal directed positions may be employed, such as the mechanism described and explained in connection with the engine of Figs. 1–7.

Thus, in the case of the engine of Fig. 8, all of the output of the fan 22 will be directed to the auxiliary chambers 40—40 whereas in the case of the engine of Figs. 1–7 only the by-pass flow portion of the fan discharge is delivered to the auxiliary chambers 40—40. Obviously, the engine of Fig. 8 lends itself to installation in an airplane in the same manner as the engine of Figs. 1–7, and as illustrated generally in Fig. 1; and the control and operation of the engine components and maneuvering of the airplane embodying the engine of Fig. 8 may be as described hereinabove. For example, it is contemplated to arrange a jet nozzle thrust deflector at the end of the exhaust pipe 80 of the engine of Fig. 8, as explained and illustrated in connection with the engine of Fig. 2 so that the engine of Fig. 8 may be installed and operated as illustrated in Fig. 1 and as described hereinabove. Also, it will be understood that the turbine 26 of the engine of Fig. 8 may be either of the simple or compound type as referred to hereinabove in connection with the engine of Figs. 1–7, whereby the fan and compressor components of the engine may be operated at the same or different speeds, as may be preferred.

What is claimed is:

1. In an aircraft, a turbine jet engine including a turbine, a primary combustion chamber, a compressor driven by said turbine supplying air to said primary combustion chamber, an auxiliary combustion chamber, a fan driven by said turbine supplying a portion of its air discharge to said primary combustion chamber and another portion thereof to said auxiliary combustion chamber, fuel supply means for said primary and auxiliary combustion chambers, said primary and auxiliary combustion chambers terminating in jet thrust nozzle devices, said auxiliary combustion chamber being mounted upon a pivot device having its axis "skewed" relative to the axis of the aircraft and adjustable to vector its devices between horizontal and vertical directions.

2. In an aircraft, a turbine jet engine including a turbine, a primary combustion chamber, a compressor driven by said turbine supplying air to said primary combustion chamber, a plurality of auxiliary combustion chambers, a fan driven by said turbine supplying air to said auxiliary combustion chamber, a fuel supply means for said primary and auxiliary combustion chambers, said main and auxiliary combustion chambers terminating in jet thrust nozzle devices disposed symmetrically relative to the plan view center line of the aircraft, each of said auxiliary combustion chambers being mounted upon a pivot device having its axis "skewed" relative to the axis of the aircraft, and means controllable to swing said auxiliary combustion chambers between horizontally and vertically directed attitudes.

3. In an aircraft, a turbine jet engine including a turbine, a primary combustion chamber, a compressor driven by said turbine supplying air to said primary combustion chamber, a plurality of auxiliary combustion chambers, a fan driven by said turbine supplying air to said auxiliary combustion chambers, fuel supply means for said primary and auxiliary combustion chambers, said primary and auxiliary combustion chambers terminating in jet thrust nozzle devices disposed symmetrically relative to the plan view center line of the aircraft, a jet thrust deflector means associated with said primary combustion chamber nozzle device and controllable to variously direct tthe discharge thrust thereof, and means controllable to pivot said auxiliary combustion chambers upon axes skewed relative to the axis of the aircraft to vary the directions of thrust of said auxiliary combustion chambers.

References Cited in the file of this patent

UNITED STATES PATENTS

| | | |
|---|---|---|
| 1,629,767 | Valdes | May 24, 1927 |
| 1,642,752 | Landon | Sept. 20, 1927 |
| 1,698,822 | Paxton | Jan. 15, 1929 |
| 1,928,578 | Turrell | Sept. 26, 1933 |
| 2,422,744 | O'Neil | June 24, 1947 |
| 2,472,839 | Kramer | June 14, 1949 |
| 2,499,401 | Madden | Mar. 7, 1950 |
| 2,518,697 | Lee | Aug. 15, 1950 |
| 2,537,487 | Stone | Jan. 9, 1951 |
| 2,589,732 | Riviere | Mar. 18, 1952 |
| 2,657,881 | Douglas | Nov. 3, 1953 |
| 2,696,079 | Kappus | Dec. 7, 1954 |
| 2,759,686 | Griffith | Aug. 21, 1956 |